(12) United States Patent
Kanao et al.

(10) Patent No.: US 8,404,394 B2
(45) Date of Patent: Mar. 26, 2013

(54) FUEL CELL SYSTEM AND METHOD OF OPERATING THE FUEL CELL SYSTEM

(75) Inventors: Yukihisa Kanao, Asaka (JP); Tomio Miyazaki, Hadano (JP)

(73) Assignee: Honda Motor Co., Ltd., Tokyo (JP)

( * ) Notice: Subject to any disclaimer, the term of this patent is extended or adjusted under 35 U.S.C. 154(b) by 1317 days.

(21) Appl. No.: 11/919,730

(22) PCT Filed: May 23, 2006

(86) PCT No.: PCT/JP2006/310612
§ 371 (c)(1),
(2), (4) Date: Oct. 31, 2007

(87) PCT Pub. No.: WO2006/126701
PCT Pub. Date: Nov. 30, 2006

(65) Prior Publication Data
US 2009/0047554 A1 Feb. 19, 2009

(30) Foreign Application Priority Data
May 23, 2005 (JP) .................................. 2005-149344

(51) Int. Cl.
*H01M 8/04* (2006.01)
*H01M 8/06* (2006.01)

(52) U.S. Cl. ........................................ 429/434; 429/423

(58) Field of Classification Search .................. 429/416, 429/417, 419
See application file for complete search history.

(56) References Cited

U.S. PATENT DOCUMENTS

| | | | |
|---|---|---|---|
| 4,522,894 A | 6/1985 | Hwang et al. | |
| 4,865,926 A | 9/1989 | Levy et al. | |
| 6,309,770 B1* | 10/2001 | Nagayasu et al. | 429/415 |
| 2004/0247960 A1 | 12/2004 | Sato et al. | |
| 2005/0136294 A1* | 6/2005 | Tsunoda | 429/12 |
| 2005/0164051 A1* | 7/2005 | Venkataraman et al. | 429/17 |

FOREIGN PATENT DOCUMENTS

| | | |
|---|---|---|
| GB | 2 132 108 A | 7/1984 |
| JP | 4-243538 | 8/1992 |
| JP | 7-192742 | 7/1995 |
| JP | 11-130403 | 5/1999 |
| JP | 11-307110 | 11/1999 |

(Continued)

OTHER PUBLICATIONS

Japanese Office Action for Application No. 2005-149344, dated Nov. 10, 2009.

*Primary Examiner* — Patrick Ryan
*Assistant Examiner* — Muhammad Siddiquee
(74) *Attorney, Agent, or Firm* — Nelson Mullins Riley & Scarborough LLP; Anthony A. Laurentano

(57) ABSTRACT

A fuel cell system includes a first heating mechanism and a second heating mechanism. The first heating mechanism supplies a reformer with some of an exhaust gas discharged from a fuel cell stack as a heat source for directly heating the reformer. The second heating mechanism supplies the remaining exhaust gas to the heat exchanger and utilizes the heat generated in the heat exchanger as a heat source for indirectly heating the reformer. Temperature sensors are attached to the reformer. An open/close valve is adjusted based on the temperatures detected by the temperature sensors to control the ratio between the amount of heat supplied from the first heating mechanism to the reformer and the amount of heat supplied from the second heating mechanism to the reformer.

5 Claims, 11 Drawing Sheets

FOREIGN PATENT DOCUMENTS

| | | |
|---|---|---|
| JP | 3106638 | 9/2000 |
| JP | 2001-338659 | 12/2001 |
| JP | 2002-42840 | 2/2002 |
| JP | 2003-229163 | 8/2003 |
| JP | 3467759 | 9/2003 |
| JP | 2004-288434 | 10/2004 |

\* cited by examiner

→ RAW FUEL (REFORMED GAS)

------> RAW FUEL (REFORMED GAS)

FUEL CELL SYSTEM AND METHOD OF OPERATING THE FUEL CELL SYSTEM

RELATED APPLICATIONS

This application is a 35 U.S.C. 371 national stage filing of International Application No. PCT/JP2006/310612, filed 23 May. 2006, which claims priority to Japan Patent Application No. 2005-149344 filed on 23 May. 2005 in Japan. The contents of the aforementioned applications are hereby incorporated by reference.

TECHNICAL FIELD

The present invention relates to a fuel cell system including a fuel cell stack, a heat exchanger, and a reformer. Further, the present invention relates to a method of operating the fuel cell system.

BACKGROUND ART

For example, a solid oxide fuel cell (SOFC) employs an electrolyte of ion-conductive oxide such as stabilized zirconia. The electrolyte is interposed between an anode and a cathode to form an electrolyte electrode assembly (unit cell). The electrolyte electrode assembly is interposed between separators (bipolar plates). In use, predetermined numbers of the unit cells and the separators are stacked together to form a fuel cell stack.

Normally, as a fuel gas supplied to the fuel cell, a hydrogen gas produced from a hydrocarbon based raw fuel by a reforming apparatus is used. In the reforming apparatus, after a reforming raw material gas is obtained from the hydrocarbon based raw fuel such as a fossil fuel, e.g., methane or LNG, the reforming raw material gas is subjected to steam reforming or partial oxidation reforming, autothermal reforming or the like to produce a reformed gas (fuel gas).

Normally, the city gas used as a raw fuel contains, in addition to methane ($CH_4$), hydrocarbon of high carbon ($C_{2+}$) such as ethane ($C_2H_6$), propane ($C_3H_6$), and butane ($C_4H_{10}$). In the case of using the hydrocarbon of high carbon as a fuel of a solid oxide fuel cell, hydrocarbon of $C_{2+}$ should be removed by reforming. It is because the carbon may be precipitated in the fuel pipe or on the anode to degrade the cell performance undesirably. In this case, the water vapor needs to be supplied excessively.

In this regard, for example, Japanese Laid-Open Patent Publication No. 2003-229163 discloses a preliminary reformer. In a steam reforming method of the preliminary reformer, reforming catalyst is filled in the preliminary reformer. In the preliminary reformer, an exhaust air from a fuel cell is utilized as a required heating source to remove hydrocarbon of $C_{2+}$ from a fuel.

In the conventional technique, the preliminary reformer is operated in the temperature range of about 300° C. to 600° C. The S/C (steam/carbon) ratio is adjusted to be in the range of 1.5 to 6.0. That is, since the operating temperature of the preliminary reformer is high, in order to avoid precipitation (coking) of carbon, the S/C ratio needs to be considerably high. Thus, it is necessary to supply water excessively for the reforming reaction. Therefore, the capacity of the water supply power source such as a water pump needs to be large. As a result, the load of the fuel cell is large uneconomically.

DISCLOSURE OF INVENTION

A main object of the present invention is to provide a fuel cell system and a method of operating the fuel cell system in which the reforming condition is maintained, and the amount of supplied water is reduced as much as possible.

The present invention relates to a fuel cell system including a fuel cell stack, a heat exchanger, and a reformer. The fuel cell stack is formed by stacking a plurality of fuel cells. Each of the fuel cells includes an electrolyte electrode assembly and a separator stacked together. The electrolyte electrode assembly includes an anode, a cathode, and an electrolyte interposed between the anode and the cathode. The heat exchanger heats an oxygen-containing gas to be supplied to the fuel cell stack. The reformer reforms a mixed fuel of a raw fuel chiefly containing hydrocarbon and water vapor to produce a reformed gas. Further, the present invention relates to a method of operating the fuel cell system.

Firstly, some of the exhaust gas discharged from the fuel cell stack after consumption in power generation reaction is supplied to the reformer as a heat source for directly heating the reformer. The remaining exhaust gas is supplied to the heat exchanger as a heat source for heating the oxygen-containing gas, and the heat generated in the heat exchanger is supplied to the reformer as a heat source for indirectly heating the reformer. The indirect heating herein means heating by the radiation heat or the convection heat.

Then, the temperature of the reformer is detected, and the flow rate of the exhaust gas supplied to the reformer is adjusted based on the detected temperature of the reformer. Thus, the state of the reformer is maintained to have predetermined reforming condition values.

Further, preferably, the reformer and the heat exchanger are provided near the fuel cell stack, and the heat exchanger is provided outside the reformer to form an indirect heating space of a second heating mechanism between the heat exchanger and the reformer. In the structure, the radiation heat or the convection heat is supplied from the heat exchanger to the reformer through the indirect heating space, and the reformer is heated desirably.

Further, preferably, the reformer has an inlet for allowing the mixed fuel to flow into the reformer through the inlet, and an outlet for allowing the reformed gas after reforming to be supplied to the fuel cell stack through the outlet. Preferably, the inlet is provided adjacent to an exhaust gas outlet of a first heating mechanism. In particular, in the structure, the inlet of the reformer which tends to have the lowest temperature by endothermic reaction of steam reforming is heated preferentially. Thus, the sharp decrease in the temperature is prevented, and the uniform temperature in the reformer is maintained. Accordingly, the reforming reaction occurs stably, and the S/C ratio is maintained at a certain level.

Further, preferably, the reforming condition value comprises the temperature of the reformer, and the molar ratio of carbon and the water vapor to the raw fuel. Thus, it is possible to lower the S/C ratio down to the coking limit. It is possible to reduce the amount of supplied water, and the load of the fuel cell is reduced effectively.

Further, preferably, the fuel cell system further includes an evaporator for evaporating water to produce the mixed fuel. Preferably, a fluid unit including the heat exchanger, the evaporator, and the reformer is provided on one side of the fuel cell stack, and the fluid unit is provided symmetrically with respect to the central axis of the fuel cell stack. In the structure, the components of the fluid unit having the high temperature are provided locally within the same area. Heat dissipation from the fluid unit is prevented. Thus, improvement in the heat recovery rate is achieved. Further, significant heat stress or heat distortion is not generated, and improvement in the durability is achieved.

Preferably, the flow direction of the remaining exhaust gas along the heat exchanger is substantially in parallel with the flow direction of the mixed fuel along the reformer. In the reformer, the temperature on the upstream side in the flow direction of the mixed fuel is the lowest. In the heat exchanger, the temperature on the upstream side in the flow direction of the remaining exhaust gas is the highest. Therefore, the temperature of the reformer becomes uniform along the flow direction of the mixed fuel by the heat from the heat exchanger.

BEST MODE FOR CARRYING OUT THE INVENTION

Figure 1:
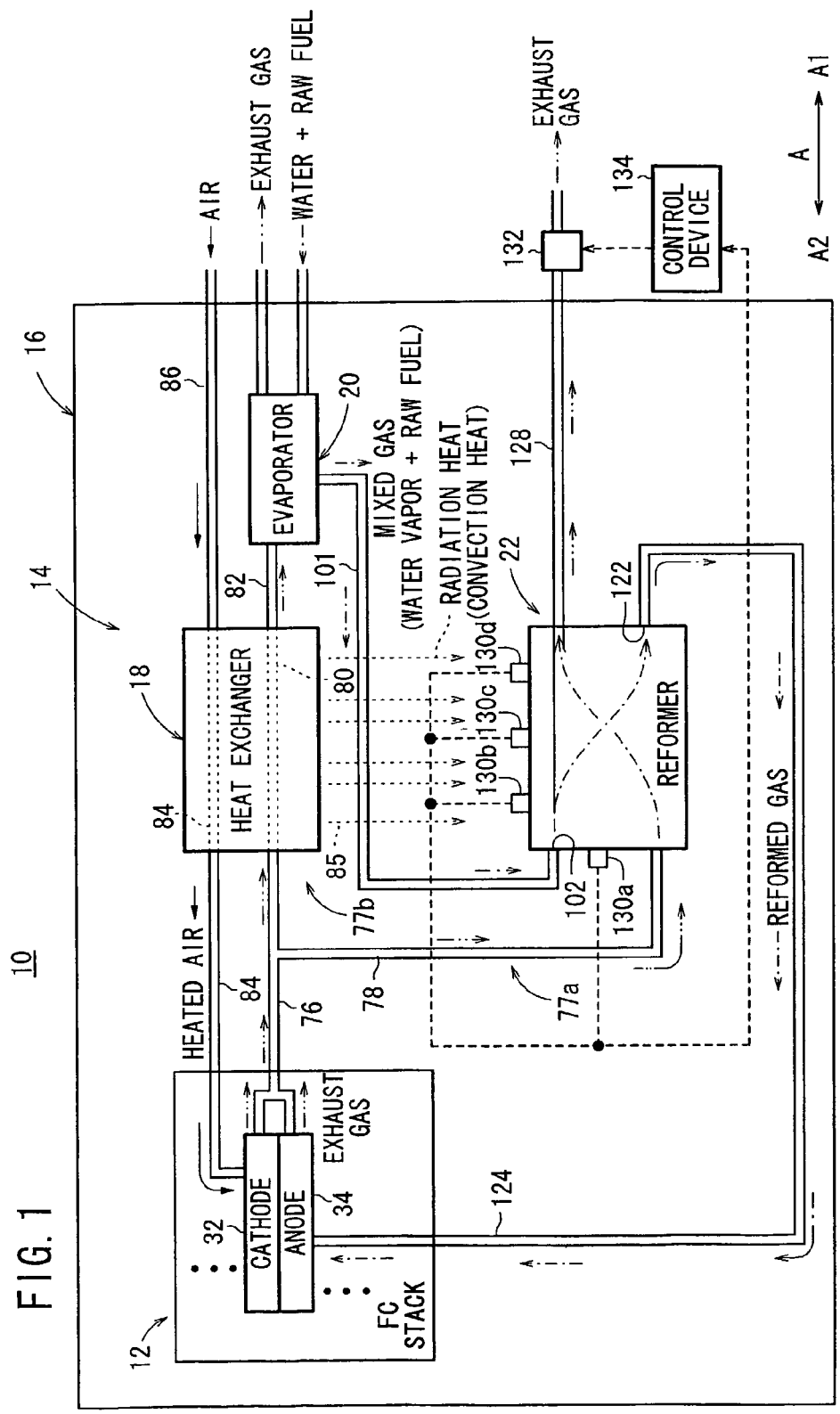
FIG. 1 is a diagram schematically showing a fuel cell system according to a first embodiment of the present invention.
Figure 2:
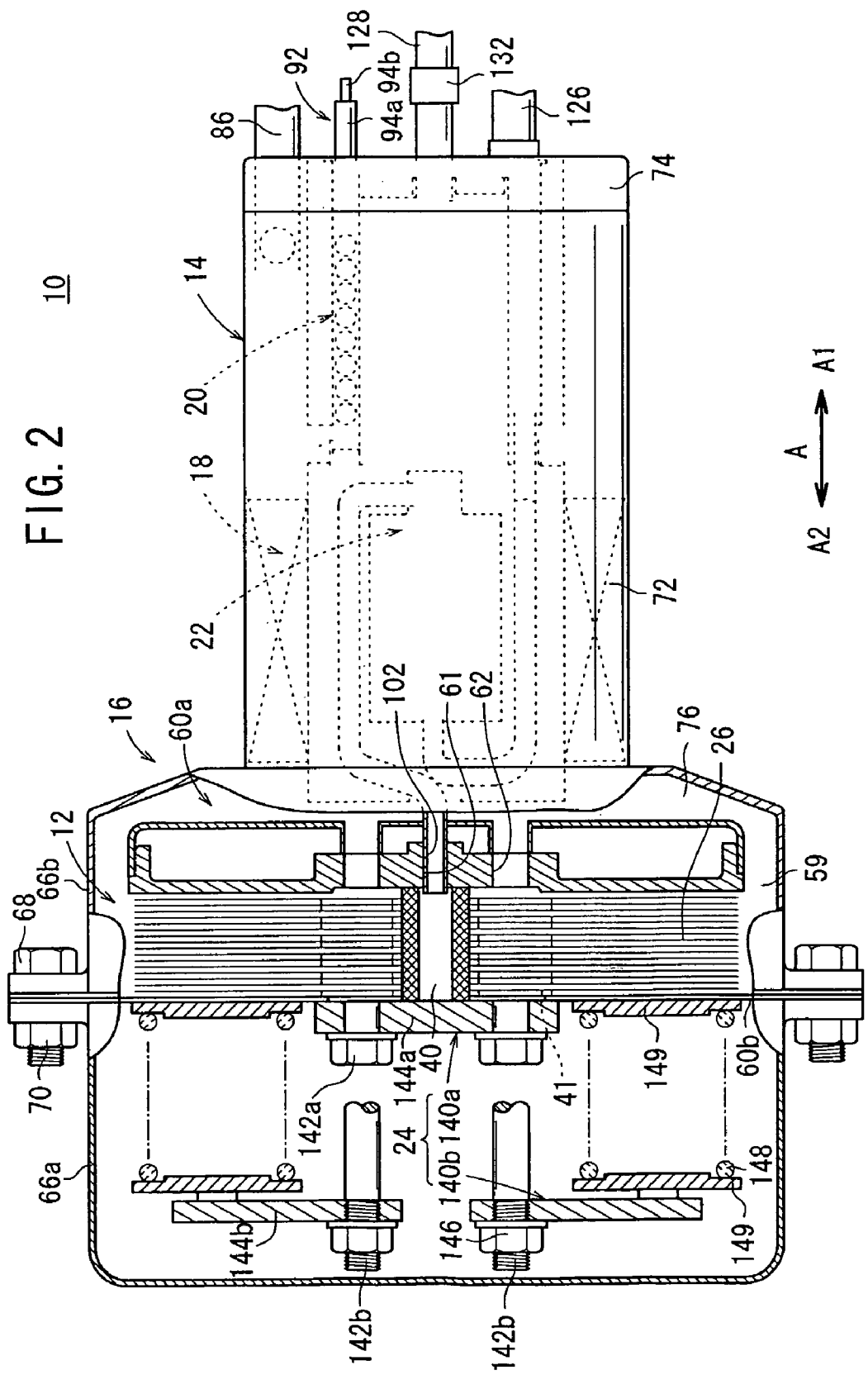
FIG. 2 is a partial cross sectional view showing the fuel cell system.

A fuel cell system 10 is used in various applications, including stationary and mobile applications. For example, the fuel cell system 10 is mounted on a vehicle. As shown in FIGS. 1 and 2, the fuel cell system 10 includes a fuel cell stack 12, a fluid unit 14 provided on one side of the fuel cell stack 12, and a casing 16 containing the fuel cell stack 12 and the fluid unit 14.

Figure 3:
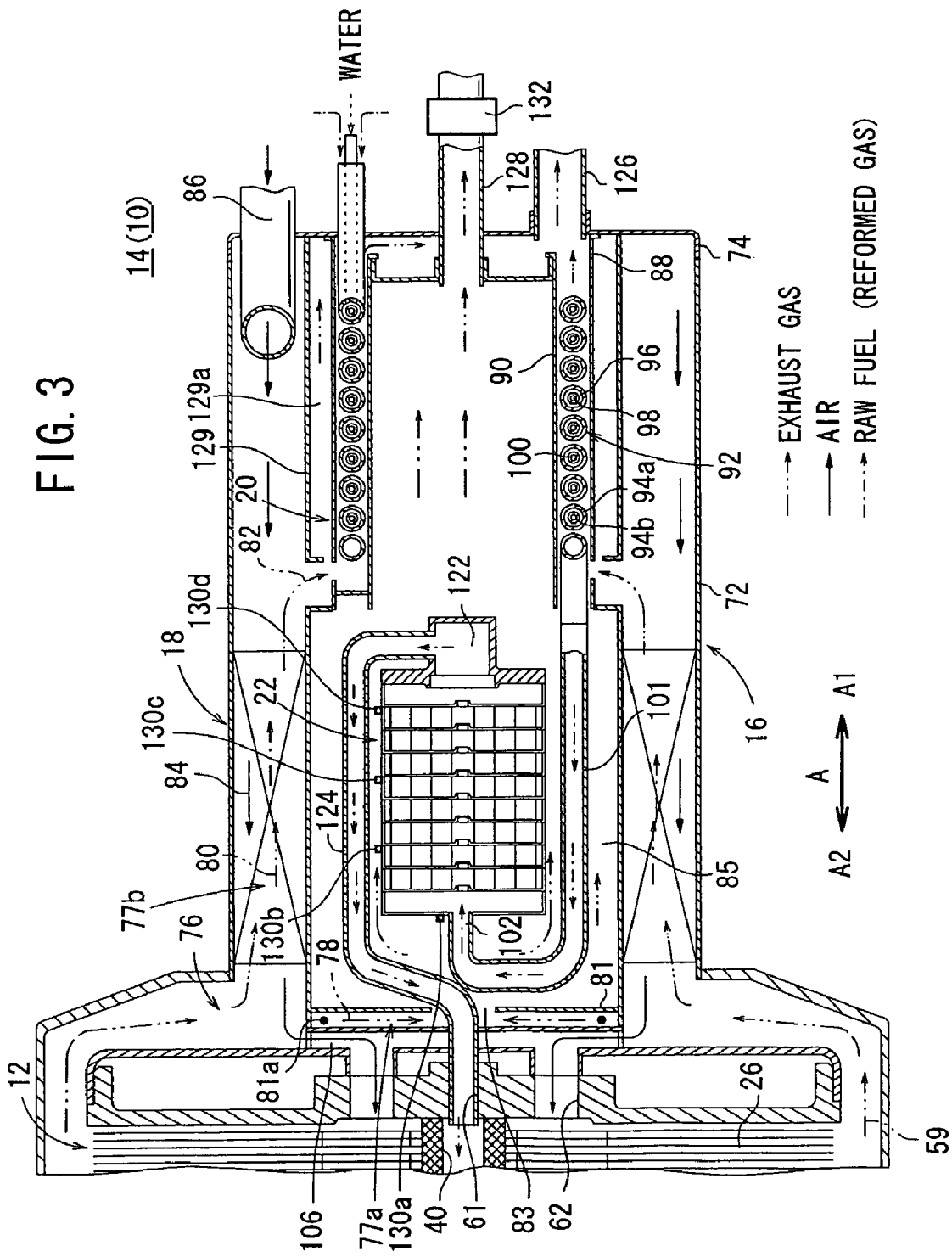
FIG. 3 is a cross sectional view showing main components of a fluid unit of the fuel cell system.

As shown in FIGS. 2 and 3, the fluid unit 14 includes a heat exchanger 18 for heating an oxygen-containing gas before it is supplied to the fuel cell stack 12, an evaporator 20 for evaporating water to produce a mixed fuel of raw fuel chiefly containing hydrocarbon (e.g., the city gas) and the water vapor, and a reformer 22 for reforming the mixed fuel to produce a reformed gas.

The reformer 22 is a preliminary reformer for producing a raw fuel gas chiefly containing methane ($CH_4$) using hydrocarbon of high carbon ($C_{2+}$) such as ethane ($C_2H_6$), propane ($C_3H_6$), and butane ($C_4H_{10}$) in the city gas by steam reforming. The operating temperature of the reformer 22 is in the range of 200° C. to 500° C., more preferably 300° C. to 400° C., further more preferably at 350° C. The S/C ratio in the reformer 22 is preferably 1.0.

Figure 4:
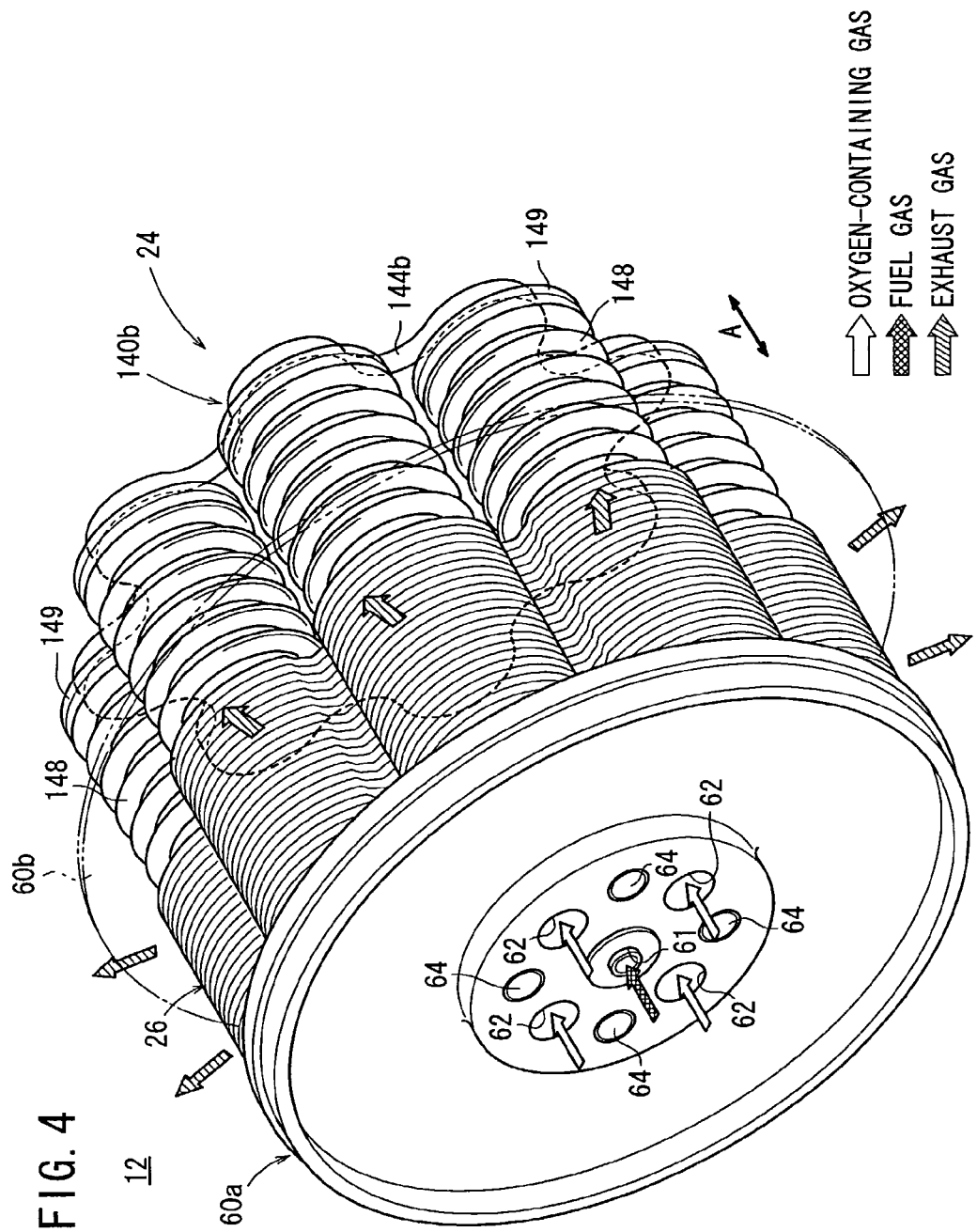
FIG. 4 is a perspective view schematically showing a fuel cell stack of the fuel cell system.

In the casing 16, a load applying mechanism 24 is provided on the other side of the fuel cell stack 12 for applying a tightening load in a stacking direction of the fuel cells 26 of the fuel cell stack 12 indicated by an arrow A (see FIGS. 2 and 4). The fluid unit 14 and the load applying mechanism 24 are provided symmetrically with respect to the central axis of the fuel cell stack 12.

Figure 5:
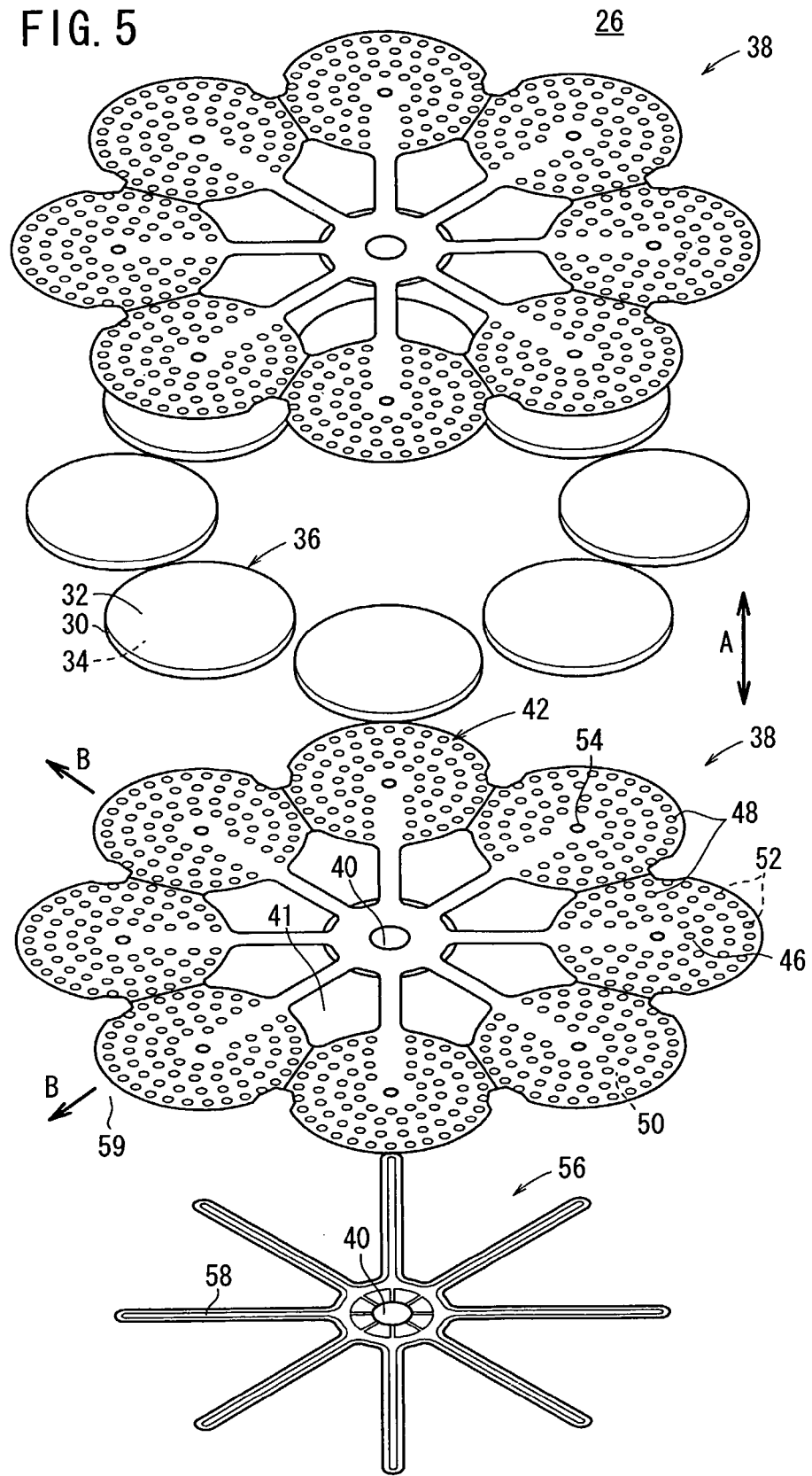
FIG. 5 is an exploded perspective view showing a fuel cell of the fuel cell stack.
Figure 6:
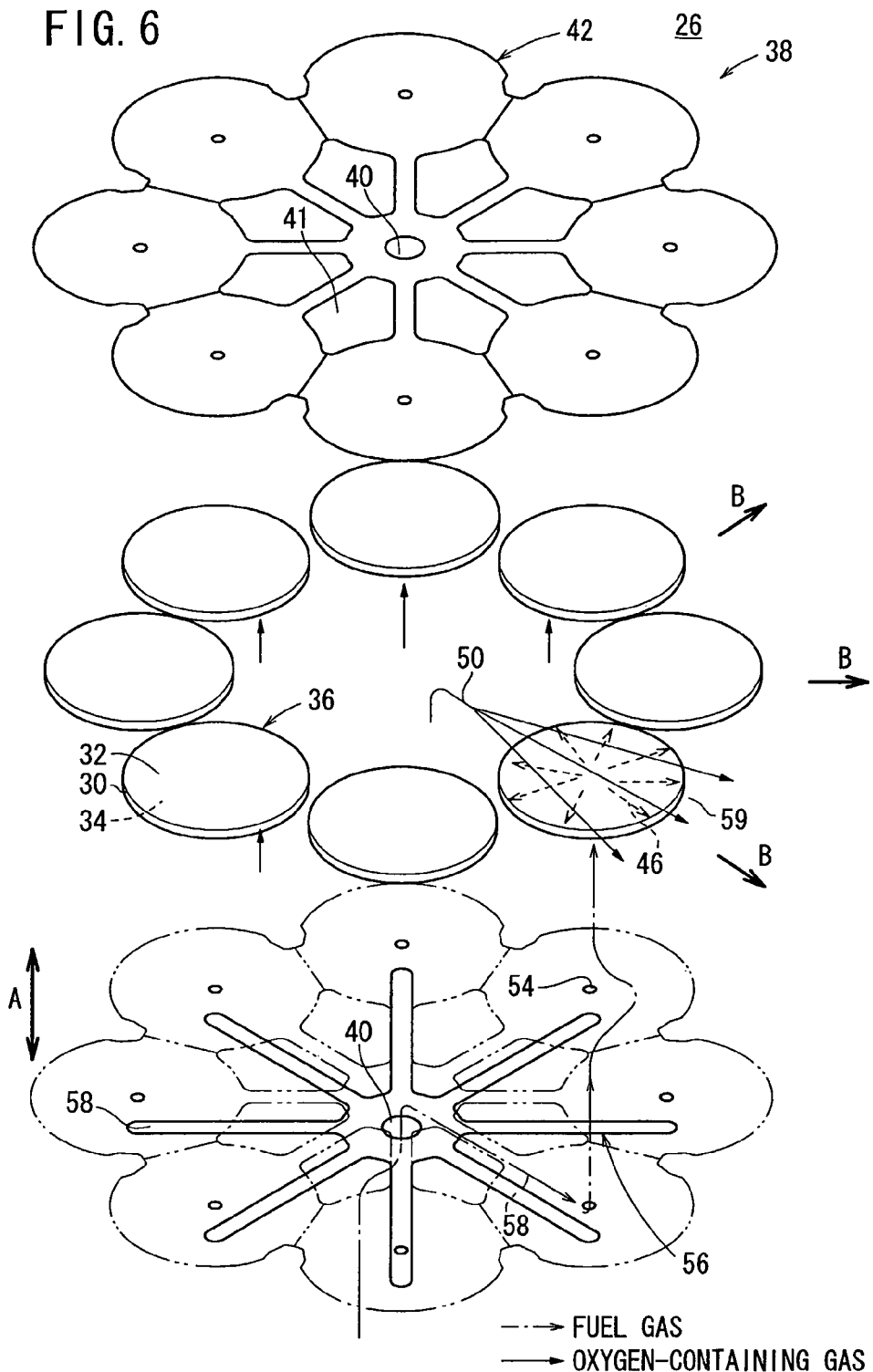
FIG. 6 is a partial exploded perspective view showing gas flows in the fuel cell.

The fuel cell 26 is a solid oxide fuel cell. As shown in FIGS. 5 and 6, the fuel cell 26 includes electrolyte electrode assemblies 36. Each of the electrolyte electrode assemblies 36 includes a cathode 32, an anode 34, and an electrolyte (electrolyte plate) 30 interposed between the cathode 32 and the anode 34. For example, the electrolyte 30 is made of ion-conductive oxide such as stabilized zirconia.

The operating temperature of the fuel cell 26 is high, about 700° C. or more. In the electrolyte electrode assembly 36, hydrogen is produced by directly reforming methane in the fuel gas at the anode 34 and the hydrogen is utilized at the anode 34 for power generation reaction.

A plurality of, e.g., eight electrolyte electrode assemblies 36 are sandwiched between a pair of separators 38 to form the fuel cell 26. The eight electrolyte electrode assemblies 36 are arranged in a circle concentric with a fuel gas supply passage 40 extending through the center of the separators 38. An oxygen-containing gas supply unit 41 is provided hermetically around the fuel gas supply passage 40.

In FIG. 5, for example, each of the separators 38 comprises a single metal plate of, e.g., stainless alloy or a carbon plate. The fuel gas supply passage 40 extends through the center of the separators 38. The separator 38 includes a plurality of circular disks 42. Each of the circular disks 42 has first protrusions 48 on its surface which contacts the anode 34. The first protrusions 48 form a fuel gas channel 46 for supplying the fuel gas along an electrode surface of the anode 34.

Each of the circular disks 42 has second protrusions 52 on its surface which contacts the cathode 32. The second protrusions 52 form an oxygen-containing gas channel 50 for supplying the oxygen-containing gas along an electrode surface of the cathode 32. As shown in FIGS. 5 and 6, each of the circular disks 42 has a fuel gas inlet 54 for supplying the fuel gas to the fuel gas channel 46.

A channel member 56 is fixed to the separator 38 by brazing or laser welding on a surface facing the cathode 32. The fuel gas supply passage 40 extends through the center of the channel member 56. The channel member 56 forms a fuel gas supply channel 58 connecting the fuel gas supply passage 40 and the fuel gas channel 46. An exhaust gas discharge channel 59 is formed around the separators 38 for discharging consumed reactant gases as an exhaust gas.

As shown in FIGS. 2 and 4, the fuel cell stack 12 includes a plurality of the fuel cells 26 stacked together, and end plates 60a, 60b provided at opposite ends in the stacking direction. A hole 61 is formed at the center of the end plate 60a, and holes 62 and screw holes 64 are formed alternately at predetermined angular intervals along the same virtual circle around the hole 61. The holes 62 are connected to an air channel 84 as described later.

As shown in FIG. 2, the casing 16 includes a first case unit 66a containing the load applying mechanism 24 and a second case unit 66b containing the fuel cell stack 12. The end plate 60b and an insulating member (not shown) are sandwiched between the first case unit 66a and the second case unit 66b. The insulating member is provided on the side of the second case unit 66b. The joint portion between the first case unit 66a and the second case unit 66b is tightened by screws 68 and nuts 70.

The second case unit 66b is joined to one end of a cylindrical third case unit 72 as part of the fluid unit 14. A head plate 74 is fixed to the other end of the third case unit 72. An exhaust gas channel 76 is provided in the third case unit 72. The exhaust gas after consumption in the power generation discharged from the exhaust gas discharge channel 59 of the fuel cell stack 12 flows through the exhaust gas channel 76 in the fluid unit 14.

As shown in FIGS. 1 and 3, the exhaust gas channel 76 is connected to a first heating mechanism 77a for supplying some of the exhaust gas to the reformer 22 as a heat source for directly heating the reformer 22, and connected to a second heating mechanism 77b for supplying the remaining exhaust gas to the heat exchanger 18 as a heat source for heating the oxygen-containing gas, and supplying the heat generated in the heat exchanger 18 to the reformer 22 as a heat source for indirectly heating the reformer 22.

The first heating mechanism 77a includes a first channel 78 connected to the exhaust gas channel 76 and the second heating mechanism 77b includes a second channel 80 connected to the exhaust gas channel 76. Further, a third channel 82 is connected to the downstream side of the second channel 80 for supplying the exhaust gas to the evaporator 20 as a heat source for evaporating water. The second channel 80 is a main passage, and the first channel 78 is branched from the second channel 80 through a plurality of holes 81a formed in a wall 81. The first channel 78 is opened to the reformer 22 through a rectification hole (exhaust gas outlet) 83 (see FIG. 3).

The reformer 22 and the evaporator 20 are arranged in the direction indicated by the arrow A1 such that the reformer 22 is positioned on the side of the fuel cell stack 12, and the evaporator 20 is positioned on the side away from the fuel cell stack 12. The heat exchanger 18 is provided outside the reformer 22. An indirect heating space 85 as part of the second heating mechanism 77b is formed between the heat exchanger 18 and the reformer 22.

The distance between the heat exchanger 18 and the reformer 22, and the fuel cell stack 12 should be minimized. The exhaust gas discharge channel 59 of the fuel cell stack 12 is directly connected to the second channel 80 of the second heating mechanism 77b through the exhaust gas channel 76. The second channel 80 is provided inside the heat exchanger 18. Further, an air channel 84 for the passage of the air is provided inside the heat exchanger 18, near the second channel 80. In the structure, the exhaust gas and the air heated by the exhaust gas flow in a counterflow manner. The air channel 84 is connected to the air supply pipe 86 at the head plate 74.

Figure 7:
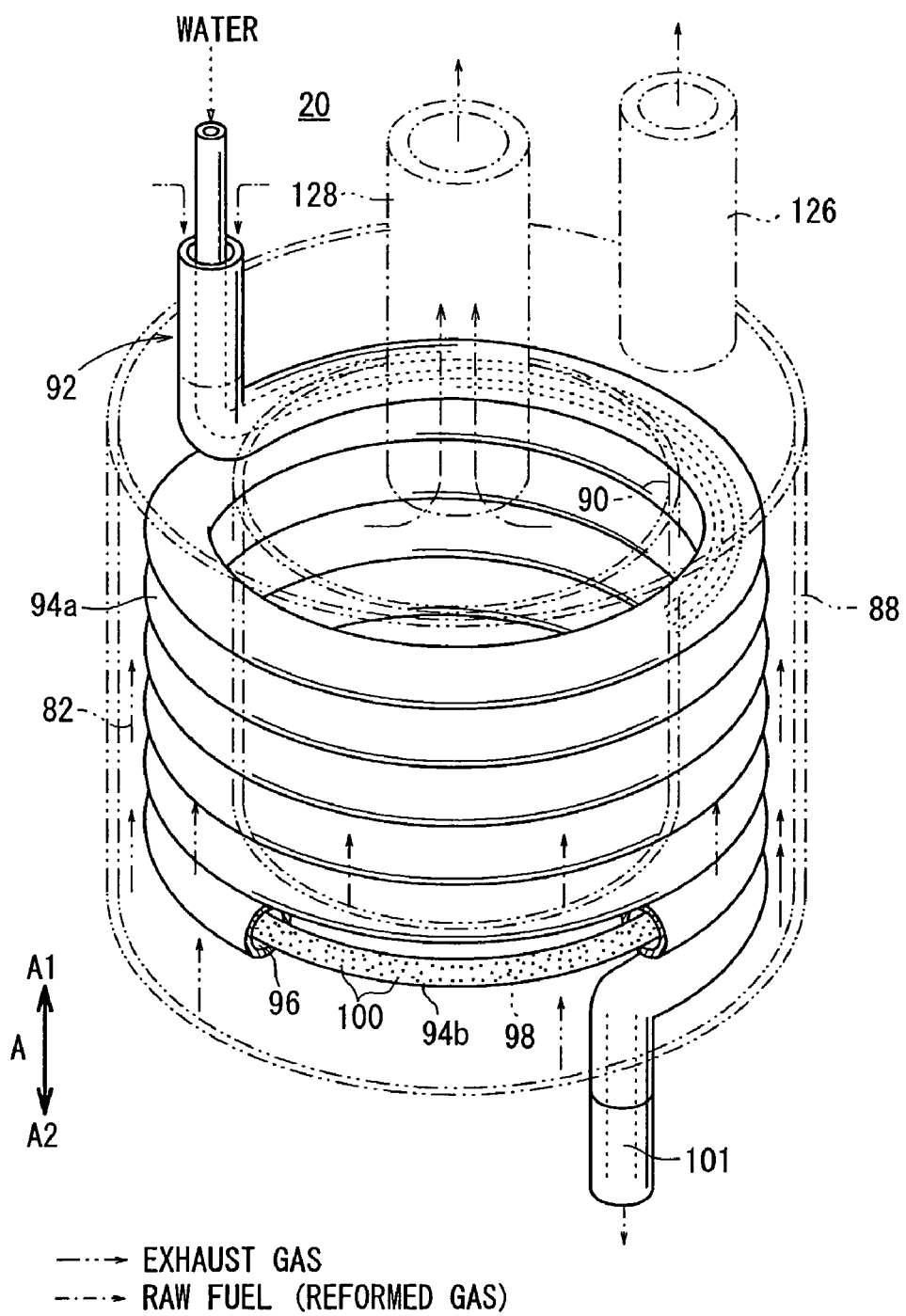
FIG. 7 is a perspective view showing main components of an evaporator of the fuel cell system.

The evaporator 20 has an outer cylindrical member 88 and an inner cylindrical member 90. The outer cylindrical member 88 and the inner cylindrical member 90 are coaxial with each other. A double pipe 92 is provided spirally between the outer cylindrical member 88 and the inner cylindrical member 90. As shown in FIGS. 3 and 7, the double pipe 92 includes an outer pipe 94a and an inner pipe 94b. The third channel 82 is formed between the outer pipe 94a, and the outer cylindrical member 88 and the inner cylindrical member 90.

A raw fuel channel 96 is formed between the outer pipe 94a and the inner pipe 94b. A water channel 98 is formed inside the inner pipe 94b. The inner pipe 94b has a plurality of holes 100 on the downstream side of the evaporator 20. For example, the diameter of the holes 100 is in the range of 10 μm to 100 μm.

An end of the double pipe 92 on the upstream side extends through the head plate 74 to the outside. At an end of the double pipe 92 on the downstream side, the inner pipe 94b is terminated, and only the outer pipe 94a extends in the direction indicated by the arrow A2. An end of a mixed fuel supply pipe 101 is connected to the outer pipe 94a, and the other end of the mixed fuel supply pipe 101 is connected to an inlet 102 of the reformer 22 (see FIG. 3). The mixed fuel supply pipe 101 extends toward the fuel cell stack 12, and is connected to the inlet 102. The inlet 102 is provided near the rectification hole 83 connected to the first channel 78 branched from the exhaust gas channel 76. The flow direction of the mixed fuel along the reformer 22 is substantially parallel to the flow direction of the exhaust gas along the heat exchanger 18, as indicated by the arrow A1.

Figure 8:
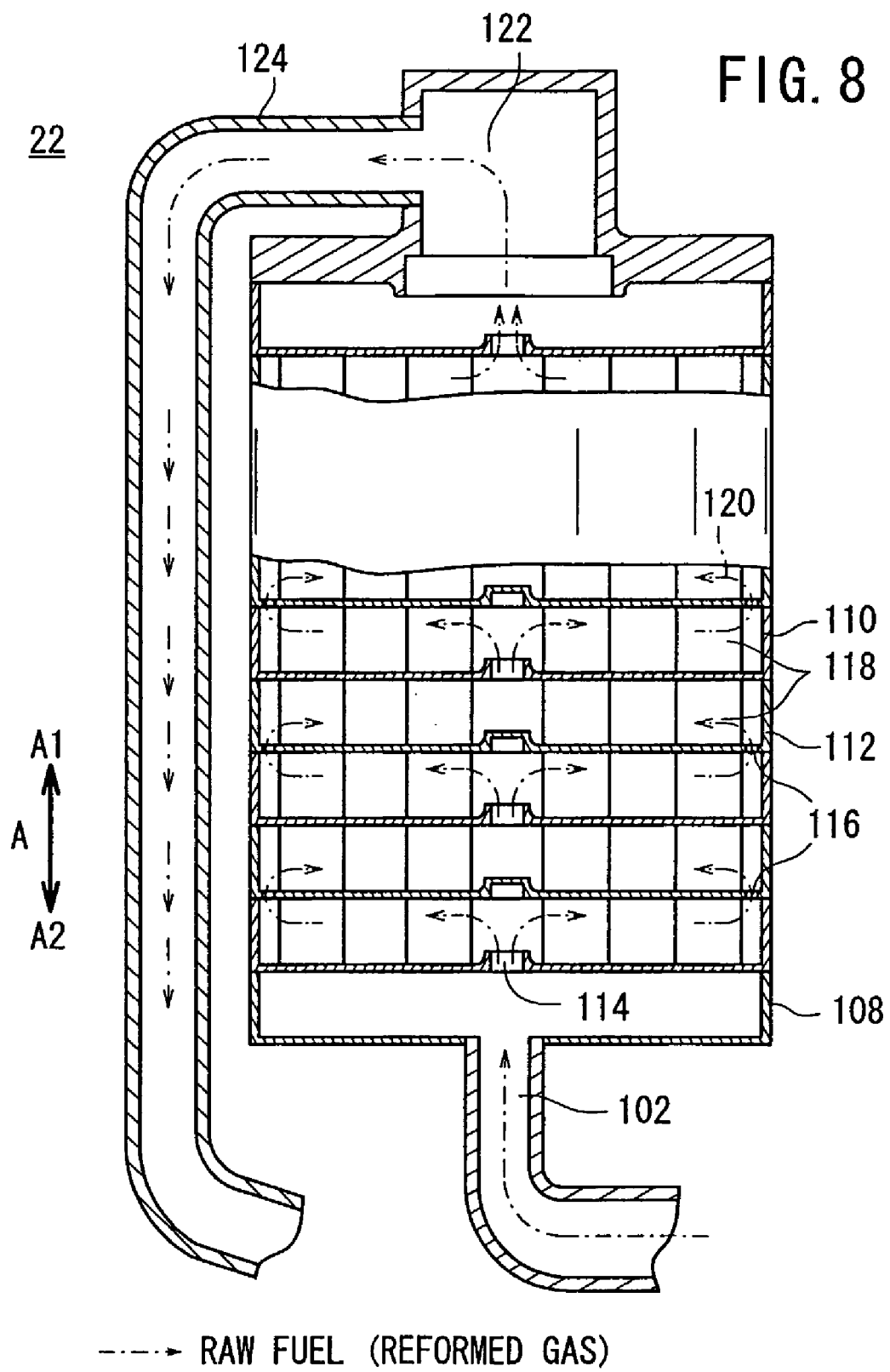
FIG. 8 is a partial cross sectional view showing a reformer of the fuel cell system.
Figure 9:
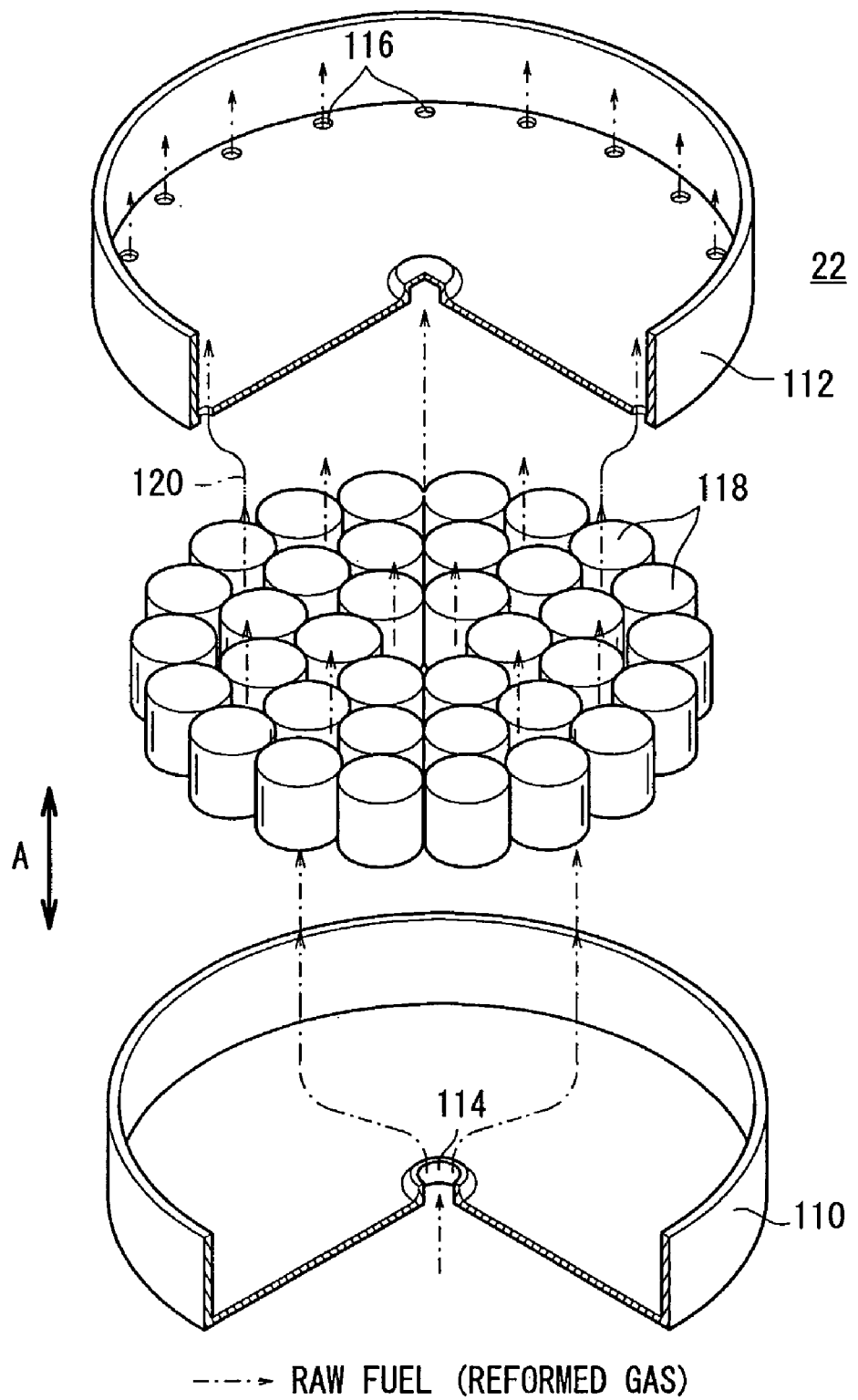
FIG. 9 is an exploded perspective view showing main components of the reformer.

As shown in FIG. 8, the reformer 22 has a lid 108, and the inlet 102 is formed at the lid 108. The lid 108 is positioned at an end of the reformer 22, and the reformer 22 is formed by connecting first receiver members 110 and second receiver members 112 alternately. As shown in FIGS. 8 and 9, the first and second receiver members 110, 112 have a substantially plate shape. A hole 114 is formed at the center of the first receiver member 110. A plurality of holes 116 are formed in a circle in the peripheral portion of the second receiver member 112.

A plurality of reforming catalyst pellets 118 are sandwiched between the first and second receiver members 110, 112. Each of the catalyst pellets 118 has a columnar shape. For example, the catalyst pellet 118 is formed by providing a nickel based catalyst on the base material of ceramics compound.

A reforming channel 120 is formed in the reformer 22. The reforming channel 120 extends in the direction indicated by the arrow A1, and has a serpentine pattern going through the holes 114 of the first receiver members 110 and the holes 116 of the second receiver members 112. On the downstream side of the reformer 22 (at the end of the reformer 22 in the direction indicated by the arrow A1), an outlet 122 is provided, and an end of a reformed gas supply passage 124 is connected to the outlet 122 (see FIG. 8). As shown in FIG. 3, the reformed gas supply passage 124 extends along the axis of the reformer 22, into the hole 61 of the end plate 60a, and is connected to the fuel gas supply passage 40.

A main exhaust gas pipe 126 and an exhaust gas pipe 128 are connected to the head plate 74. The main exhaust gas pipe 126 is connected to the third channel 82 of the evaporator 20. The exhaust gas pipe 128 is provided at the center of the evaporator 20 for discharging the exhaust gas flowing around the reformer 22 in the direction indicated by the arrow A1.

A cylindrical cover 129 is provided around the outer cylindrical member 88 of the evaporator 20. A heat insulating layer 129a is formed in a closed space between the cylindrical cover 129 and the outer cylindrical member 88. The heat insulating layer 129a is connected to the second channel 80, and some of the exhaust gas is filled in the heat insulating layer 129a.

As shown in FIG. 1, the fuel cell system 10 includes a plurality of temperature sensors (temperature detection unit) 130a to 130d for detecting the temperature of the reformer 22, such as thermocouples, an open/close valve (valve mechanism) 132 for regulating the flow rate of the exhaust gas supplied to the first heating mechanism 77a, and a control device (valve control mechanism) 134 for regulating the ratio between the amount of heat supplied from the first heating mechanism 77a to the reformer 22 and the amount of heat supplied from the second heating mechanism 77b to the reformer 22 by adjusting the open/close valve 132 in order to maintain the state of the preliminary reformer to have predetermined reforming condition values.

The temperature sensor 130a is provided near the inlet 102 of the reformer 22. The temperature sensors 130b to 130d are successively disposed along the flow direction of the mixed fuel gas in the reformer 22 in the direction indicated by the arrow A1. The temperature sensor 130d is provided at the nearest position from the outlet 122 of the reformer 22. The open/close valve 132 is provided at the exhaust gas pipe 128. Incidentally, instead of the open/close valve 132, a variable valve having different valve positions for changing the opening degree of the valve may be provided at the exhaust gas pipe 128.

As shown in FIG. 2, the load applying mechanism 24 includes a first tightening unit 140a for applying a first tightening load to a region around (near) the fuel gas supply passage 40 and a second tightening unit 140b for applying a second tightening load to the electrolyte electrode assemblies 36. The second tightening load is smaller than the first tightening load.

As shown in FIGS. 2 and 4, the first tightening unit 140a includes short first tightening bolts 142a screwed into screw holes 64 formed along one diagonal line of the end plate 60a. The first tightening bolts 142a extend in the stacking direction of the fuel cells 26, and engage a first presser plate 144a. The first presser plate 144a is a narrow plate, and engages the central position of the separator 38 to cover the fuel gas supply passage 40.

The second tightening unit 140b includes long second tightening bolts 142b screwed into screw holes 64 formed along the other diagonal line of the end plate 60a. Ends of the second tightening bolts 142b extend through a second presser plate 144b having a curved outer section. Nuts 146 are fitted to the ends of the second tightening bolts 142b. Springs 148 and spring seats 149 are provided in respective circular portions of the second presser plate 144b, at positions corresponding to the electrolyte electrode assemblies 36 on the circular disks 42 of the fuel cell 26. For example, the springs 148 are ceramics springs.

Operation of the fuel cell system 10 will be described below.

As shown in FIGS. 3 and 7, a raw fuel such as the city gas (including $CH_4$, $C_2H_6$, $C_3H_8$, and $C_4H_{10}$) is supplied to the raw fuel channel 96 of the double pipe 92 of the evaporator 20, and water is supplied to the water channel 98 of the double pipe 92. Further, an oxygen-containing gas such as the air is supplied to the air supply pipe 86.

In the evaporator 20, the raw fuel moves spirally along the raw fuel channel 96 in the double pipe 92, the water moves spirally along the water channel 98, and the exhaust gas as described later flows through the third channel 82. Thus, the water moving through the water channel 98 is evaporated, and gushes out from a plurality of holes 100 formed on the downstream side of the inner pipe 94b to the raw fuel channel 96.

At this time, the water vapor is mixed with the raw fuel flowing through the raw fuel channel 96, and the mixed fuel is obtained. The mixed fuel is supplied to the inlet 102 of the reformer 22 through the mixed fuel supply pipe 101 connected to the outer pipe 94a. As shown in FIG. 8, the mixed fuel supplied from the inlet 102 into the reformer 22 flows through the hole 114 of the first receiver member 110. The mixed fuel is reformed by the catalyst pellets 118 interposed between the first and second receiver members 110, 112. Further, the mixed fuel is supplied to the next pellets 118 from the holes 116 formed in the peripheral portion of the second receiver member 112.

Thus, the mixed fuel moving along the reforming channel 120 having the serpentine pattern in the reformer 22 is reformed by steam reforming. Thus, hydrocarbon of $C_{2+}$ is eliminated to produce a reformed gas (fuel gas) chiefly containing methane. The reformed gas flows through the reformed gas supply passage 124 connecting to the outlet 122 of the reformer 22. Then, the reformed gas is supplied to the fuel gas supply passage 40 of the fuel cell stack 12. The reformed gas supply passage 124 extending along the axis of the reformer 22 is heated by the exhaust gas branched from the first channel 78 and the heat radiated from the heat exchanger 18. The temperature of the reformed gas supply passage 124 is increased to the temperature range (e.g., 600° C.) where power generation reaction occurs.

As shown in FIGS. 5 and 6, the fuel gas from the fuel gas supply passage 40 flows along the fuel gas supply channel 58. The fuel gas flows from the fuel gas inlet 54 of the circular disk 42 into the fuel gas channel 46. In each of the electrolyte electrode assemblies 36, the fuel gas inlet 54 is formed at substantially the central position of the anode 34. Therefore, the fuel gas is supplied from the fuel gas inlet 54 to the substantially center of the anode 34. Thus the methane in the fuel gas is reformed to produce a hydrogen gas. The fuel gas chiefly containing the hydrogen moves along the fuel gas channel 46 toward the outer region of the anode 34.

As shown in FIG. 3, when the air supplied from the air supply pipe 86 to the heat exchanger 18 moves along the air channel 84 of the heat exchanger 18, heat exchange is carried out between air and the burned exhaust gas as descried later flowing along the second channel 80. Thus, the air is heated to a predetermined temperature. As shown in FIGS. 5 and 6, the air heated in the heat exchanger 18 is supplied to the oxygen-containing gas supply unit 41 of the fuel cell stack 12, and flows into a space between the inner circumferential edge of the electrolyte electrode assembly 36 and the inner circumferential edge of the circular disk 42 in the direction indicated by the arrow B. Therefore, the air flows from the inner circumferential edge to the outer circumferential edge of the cathode 32 along the oxygen-containing gas channel 50.

Thus, in the electrolyte electrode assembly 36, the fuel gas flows along the anode 34, and the air flows along the cathode 32 for generating electricity by electrochemical reactions at the anode 34 and the cathode 32. The exhaust gas is discharged to the outside of each of the electrolyte electrode assemblies 36, and flows in the stacking direction along the exhaust gas discharge channel 59. Then, the exhaust gas flows into the exhaust gas channel 76.

The exhaust gas flowing through the exhaust gas channel 76 has the high temperature of about 700° C. As shown in FIG. 3, the exhaust gas partially flows into the first channel 78 branched through the hole 81a. The exhaust gas is supplied into the inlet 102 of the reformer 22 from the rectification hole 83 of the wall 81. After the exhaust gas locally heats the inlet 102 of the reformer 22, the exhaust gas flows inside the evaporator 20, and is discharged to the outside from the exhaust gas pipe 128.

Further, the remaining exhaust gas supplied to the second channel 80 of the exhaust gas channel 76 flows through the heat exchanger 18. Heat exchange between the exhaust gas and the air is performed. The air is heated to a predetermined temperature, and the temperature of the exhaust gas is decreased. Some of the exhaust gas is filled in the heat insulating layer 129a, and the remaining exhaust gas flows into the third channel 82 connected to the second channel 80. The third channel 82 is formed between the outer cylindrical member 88 and the inner cylindrical member 90 of the double pipe 92 of the evaporator 20. The exhaust gas evaporates the water flowing through the water channel 98 of the double pipe 92. Therefore, it is possible to reliably produce the mixed fuel of the raw fuel and the water vapor in the raw fuel channel 96. After the exhaust gas flows through the evaporator 20, the exhaust gas is discharged to the outside through the main exhaust gas pipe 126.

In the first embodiment, as shown in FIG. 1, the first heating mechanism 77a and the second heating mechanism 77b are provided. The first heating mechanism 77a directly supplies some of the exhaust gas discharged into the exhaust gas channel 76, to the reformer 22. The second heating mechanism 77b supplies the remaining exhaust gas to the heat exchanger 18, and supplies the heat generated in the heat exchanger 18 through the space 85 to the reformer 22 as the heat source for indirectly heating the reformer 22.

In the structure, the reformer 22 is directly heated by some of the exhaust gas supplied from the first channel 78 of the first heating mechanism 77a. The heat generated in the heat exchanger 18 is used for indirectly heating the reformer 22 by radiation or convection through the space 85.

Temperatures at the respective positions of the reformer 22 are detected by the temperature sensors 130a to 130d attached to the reformer 22, and the temperature data of the detected temperatures t are inputted to the control device 134. The control device 134 compares the predetermined temperature T (e.g., 350° C.) as one of predetermined reforming condition values with each of the detected temperatures t. The open/close valve 132 is opened or closed under control to achieve the state where the detected temperature t=the predetermined temperature T.

Specifically, since the reformer 22 is indirectly heated by the heat exchanger 18, the temperature in the reformer 22 becomes uniform. When the detected temperature t is lower than the predetermined temperature T (t<T), the open/close valve 132 is opened more widely in comparison with the case where the detected temperature t is equal to the predetermined temperature T (t=T). Thus, the flow rate of the exhaust gas flowing from the exhaust gas channel 76 into the first channel 78 is increased, and the reformer 22 is heated directly by the exhaust gas to the greater extent. As a result, the temperature difference between the detected temperature t and the predetermined temperature T is reduced. Accordingly, the direct heating by the exhaust gas supplied from the first channel 78 and the indirect heating by the radiation heat or the convection heat from the heat exchanger 18 are balanced.

Further, when the detected temperature t is higher than the predetermined temperature (t>T), the open/close valve 132 is closed narrowly in comparison with the case where the detected temperature t is equal to the predetermined temperature T (t=T).

By the control as described above, even if the operating condition of the fuel cell system 10 is changed, it is possible to accurately regulate the temperature of the reformer 22 to the predetermined temperature T. By the control, the optimum reforming condition is achieved regardless of the operating condition of the fuel cell system 10. Therefore, the size of the reformer 22 is reduced. Further, the temperature of the reformer 22 becomes uniform at the predetermined reforming condition value, i.e., at the temperature of 350° C., for example. It is possible to determine the S/C ratio at 1.0. As a result, the S/C ratio can be lowered down to the coking limit.

Thus, the amount of supplied water is reduced significantly. The capacity of the water supply power source such as the water pump and the consumption amount of water is reduced significantly. The metal member on the anode 34 side is not oxidized significantly by water vapor. As a result, improvement in the durability is achieved. Since it is not necessary to supply the water excessively, power generation in the fuel cell stack 12 can be performed efficiently.

Moreover, since the amount of supplied water is reduced, the amount of water vapor in the exhaust gas is reduced. Stated otherwise, it is possible to reduce the latent heat of the water vapor which is consumed wastefully in the exhaust gas, heat loss is reduced and the waste heat is collected easily.

Thus, no unduly high performance is required for the heat exchanger 18 and the evaporator 20, and the sizes of the heat exchanger 18 and the evaporator 20 can be reduced.

Further, simply by operating the single open/close valve 132, it is possible to maintain the state of the reformer 22 to have predetermined reforming condition values. With the simple structure and process, the reforming reaction is carried out desirably.

Further, since the exhaust gas discharged from the fuel cell stack 12 is used as the heat source for directly and/or indirectly heating the reformer 22, the recovery rate of the waste heat is improved economically.

Steam reforming is performed in the reformer 22, and in particular, the temperature around the inlet 102 tends to be decreased. Therefore, by locally heating the inlet 102 of the reformer 22 using the hot exhaust gas, it is possible to limit the decrease in the temperature of the reformer 22.

Figure 10:
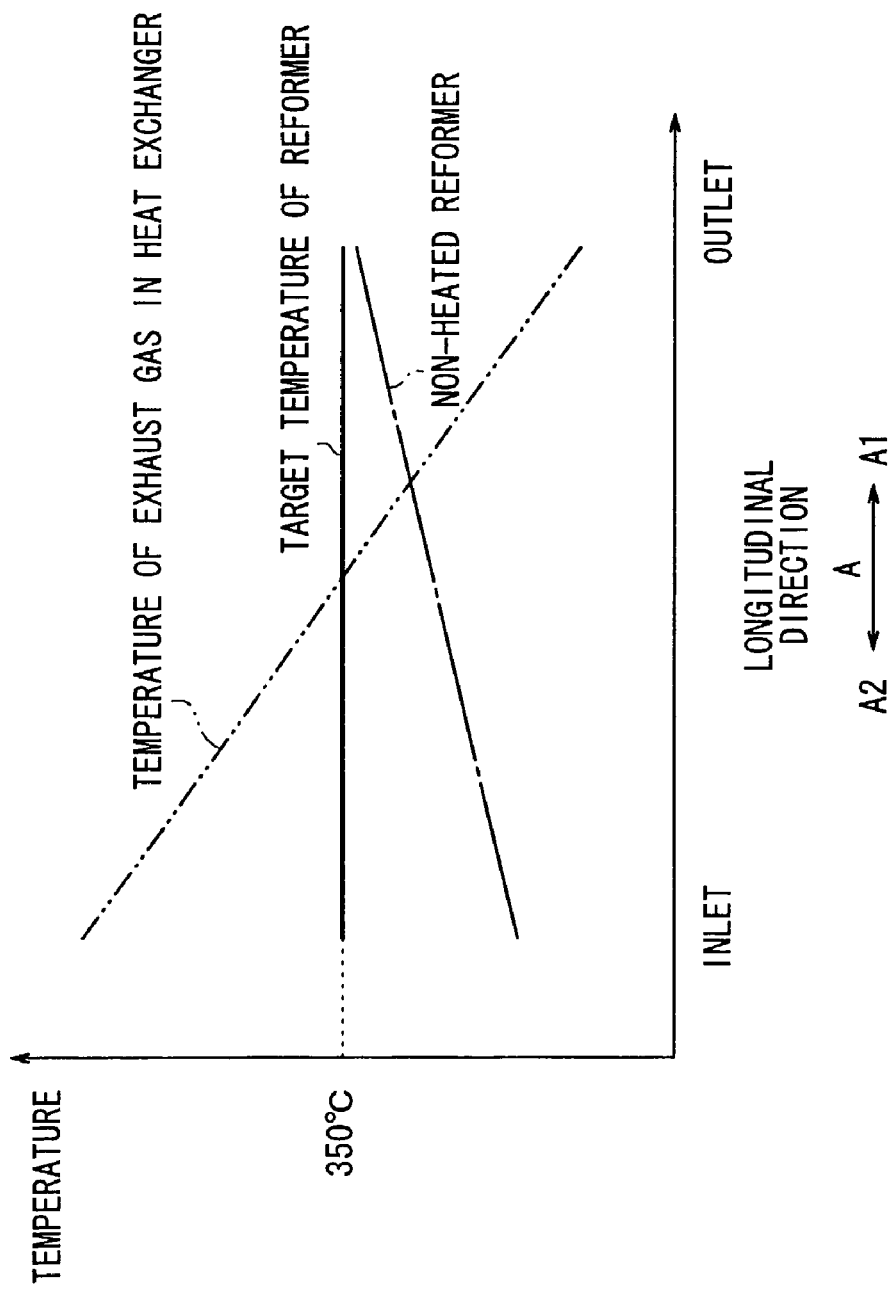
FIG. 10 is a graph showing the relationship between the temperature and the position in the reformer, in the case of regulating the temperature in the longitudinal direction of the reformer.

Further, in the first embodiment, the flow direction of the exhaust gas along the heat exchanger 18 is substantially in parallel with the flow direction of the mixed fuel along the reformer 22. In the heat exchanger 18, the temperature on the inlet side is considerably low in comparison with the temperature on the outlet side. A predetermined temperature gradient is generated in the longitudinal direction of the heat exchanger 18 indicated by the arrow A (see FIG. 10). In the reformer 22, the temperature around the inlet 102 tends to be the lowest due to the strong endothermic reaction at the inlet 102.

In the heat exchanger 18, the temperature at the inlet is the highest. In the reformer 22, the temperature at the inlet 102 is the lowest. The inlet of the heat exchanger 18 and the inlet 102 of the reformer 22 are provided adjacent to each other, and the hot exhaust gas is supplied to the inlet 102. In the structure, through the temperature gradient of the heat exchanger 18 in the direction indicated by the arrow A, the reformer 22 is heated so that the temperature in the reformer 22 becomes uniform in the longitudinal direction. The decrease in the temperature at the inlet 102 of the reformer 22 is suppressed. Thus, the temperature in the reformer 22 is maintained at a certain level, and the stability of the temperature is achieved. Therefore, the coking limit can be substantially uniform in the entire reformer 22. By decreasing the maximum temperature in the reformer 22, it is possible to lower the S/C ratio.

Further, the fluid unit 14 including the heat exchanger 18, the evaporator 20, and the reformer 22 are provided on one side of the fuel cell stack 12, and the fluid unit 14 is provided symmetrically with respect to the central axis of the fuel cell stack 12. Therefore, the fluid unit 14 having the high temperature in the fuel cell system 10 is provided locally within the same area. Heat radiation from the fluid unit 14 is reduced. Thus, it is possible to increase the heat recovery rate. Further, since the fluid unit 14 is provided symmetrically with respect to the central axis of the fuel cell stack 12, significant heat stress or heat distortion is not generated, and improvement in the durability is achieved.

Further, since the heat exchanger 18 and the reformer 22 are provided near the fuel cell stack 12, the heat is transferred from the fuel cell stack 12 easily and reliably. Accordingly, it is possible to increase the heat recovery rate.

Figure 11:
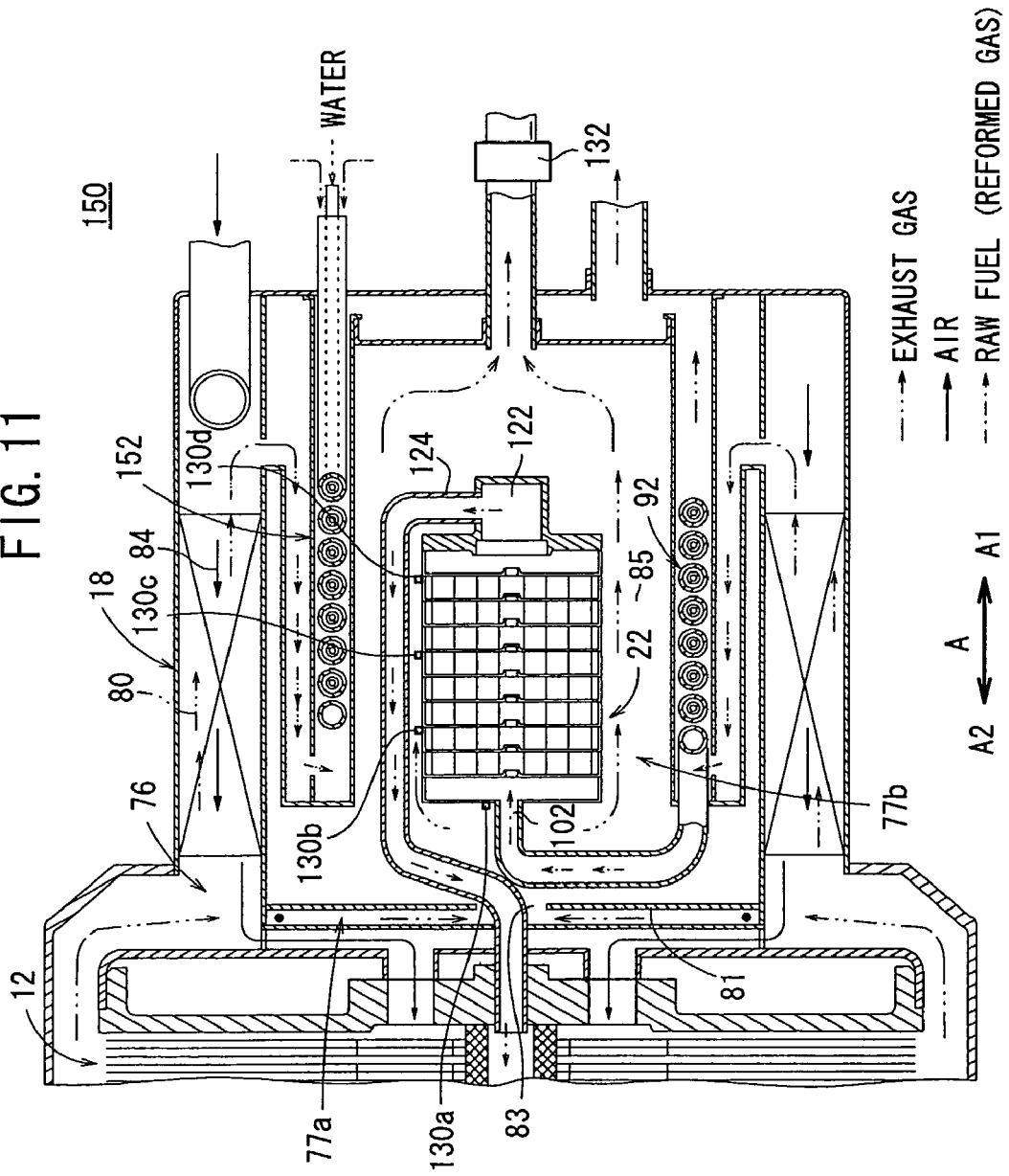
FIG. 11 is a cross sectional view showing main components of a fluid unit of a fuel cell system according to a second embodiment of the present invention.

FIG. 11 is a cross sectional view showing main components of a fluid unit 150 of a fuel cell system according to a second embodiment of the present invention. The constituent elements that are identical to those of the fuel cell system 10 according to the first embodiment are labeled with the same reference numeral, and description thereof will be omitted.

A fluid unit 150 includes a heat exchanger 18, a reformer 22, and an evaporator 152. The fluid unit 150 is provided on one side of the fuel cell stack 12, symmetrically with respect to the central axis of the fuel cell stack 12. In the fluid unit 150, the evaporator 152 is provided outside the reformer 22, and the heat exchanger 18 is provided outside the evaporator 152.

In the second embodiment, the evaporator 152 and the reformer 22 are provided inside the heat exchanger 18. In the structure, it is possible to heat the reformer 22 by the radiation heat and the convection heat from the heat exchanger 18. Improvement in the heat insulation performance of the evaporator 152 is achieved effectively. It is possible to produce the water vapor easily. Further, the dimension of the fluid unit 150 in the direction indicated by the arrow A is reduced effectively. Accordingly, reduction in the overall size of the fuel cell system is achieved easily.

Industrial Applicability

According to the present invention, the reformer is directly heated by some of the exhaust gas, and indirectly heated by the heat exchanger to which the remaining exhaust gas is supplied. By the direct heating and/or the indirect heating using the exhaust gas, the state of the reformer is maintained to have the predetermined reforming condition values reliably, and it is possible to lower the S/C ratio down to the coking limit. Thus, the amount of supplied water is reduced significantly, and the load of the water supply power source such as the water pump is reduced efficiently.

Further, simply by operating the single valve mechanism, the state of the reformer is maintained to have predetermined reforming condition values. With the simple structure and process, the reforming reaction is carried out to the greater extent. Further, by utilizing the exhaust gas as the heat source for directly and/or indirectly heating the reformer, significant improvement in the recovery rate of the waste heat is achieved economically.

The invention claimed is:

1. A fuel cell system comprising:
    a fuel cell stack formed by stacking a plurality of fuel cells, said fuel cells each including an electrolyte electrode assembly and a separator stacked together, said electrolyte electrode assembly including an anode, a cathode, and an electrolyte interposed between said anode and said cathode;
    a heat exchanger for heating an oxygen-containing gas to be supplied to said fuel cell stack;
    a reformer for reforming a mixed fuel of a raw fuel chiefly containing hydrocarbon and water vapor to produce a reformed gas;
    a first heating mechanism for supplying some of an exhaust gas discharged from said fuel cell stack after consumption in power generation reaction to said reformer as a heat source for directly heating said reformer;
    a second heating mechanism for supplying the remaining exhaust gas to said heat exchanger as a heat source for heating the oxygen-containing gas, and supplying the heat generated in said heat exchanger to said reformer as a heat source for indirectly heating said reformer;
    a temperature detection unit for detecting the temperature of said reformer;
    a valve mechanism for adjusting the flow rate of the exhaust gas supplied to said first heating mechanism; and
    a valve control mechanism for adjusting said valve mechanism based on the temperature of said reformer detected by said temperature detection unit to control the ratio between the amount of heat supplied from said first heating mechanism to said reformer and the amount of heat supplied from said second heating mechanism to said reformer in order to maintain the state of said reformer to have a predetermined reforming condition value,
    wherein:
        the heat exchanger includes an inlet for receiving exhaust gas discharged from the fuel cell stack and an outlet for releasing the exhaust gas from the heat exchanger, and the exhaust gas flows through the heat exchanger from the inlet to the outlet in a first flow direction,
        the reformer includes an inlet for receiving exhaust gas discharged from the fuel cell stack and an outlet for releasing the exhaust gas from the reformer, and the exhaust gas flows through the reformer from the inlet to the outlet in a second flow direction, and
        the first flow direction and the second flow direction are substantially the same.

2. A fuel cell system according to claim 1, wherein said reformer and said heat exchanger are provided near said fuel cell stack, and said heat exchanger is provided outside said reformer to form an indirect heating space of said second heating mechanism between said heat exchanger and said reformer.

3. A fuel cell system according to claim 1, wherein said reformer has an inlet and an outlet;
    the mixed fuel flows into said reformer through said inlet, and the reformed gas after reforming is supplied to said fuel cell stack through said outlet; and
    said inlet is provided adjacent to an exhaust gas outlet of said first heating mechanism.

4. A fuel cell system according to claim 1, wherein said reforming condition value comprises the temperature of said reformer, and the molar ratio of carbon and the water vapor to the raw fuel.

5. A fuel cell system according to claim 1, further comprising an evaporator for evaporating water to produce the mixed fuel, wherein
    a fluid unit including said heat exchanger, said evaporator, and said reformer is provided on one side of said fuel cell stack, and said fluid unit is provided symmetrically with respect to the central axis of said fuel cell stack.

* * * * *